United States Patent
Desai et al.

(10) Patent No.: US 10,540,464 B1
(45) Date of Patent: Jan. 21, 2020

(54) CRITICAL PATH AWARE VOLTAGE DROP ANALYSIS OF AN INTEGRATED CIRCUIT

(71) Applicant: Cadence Design Systems, Inc., San Jose, CA (US)

(72) Inventors: Suketu Desai, Milpitas, CA (US); Anshu Mani, Noida (IN); Apurva Soni, Milpitas, CA (US); Shivani Sharma, Haryana (IN); Avnish Varma, Noida (IN); Xin Gu, Austin, TX (US)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 38 days.

(21) Appl. No.: 16/103,888

(22) Filed: Aug. 14, 2018

(51) Int. Cl.
  *G06F 17/50* (2006.01)
(52) U.S. Cl.
  CPC ...... *G06F 17/5031* (2013.01); *G06F 2217/78* (2013.01); *G06F 2217/84* (2013.01)
(58) Field of Classification Search
  CPC ............ G06F 17/5031; G06F 2217/84; G06F 2217/78
  USPC ....................................................... 716/108
  See application file for complete search history.

(56) References Cited

U.S. PATENT DOCUMENTS

| | | | |
|---|---|---|---|
| 7,627,844 B2 * | 12/2009 | Rahmat | G06F 17/5081 716/113 |
| 7,844,438 B1 | 11/2010 | Verghese et al. | |
| 8,464,198 B1 * | 6/2013 | Chakravarty | G06F 17/505 716/106 |
| 8,566,767 B1 | 10/2013 | Kukal et al. | |
| 8,788,995 B1 | 7/2014 | Kumar et al. | |
| 8,954,917 B1 | 2/2015 | Shu et al. | |
| 9,619,604 B1 | 4/2017 | Rai et al. | |
| 9,881,120 B1 | 1/2018 | Ginetti et al. | |
| 10,460,055 B1 * | 10/2019 | Gogoi | G06F 17/5009 |
| 2004/0249588 A1 * | 12/2004 | Shimazaki | G01R 31/318357 702/66 |

\* cited by examiner

*Primary Examiner* — Jack Chiang
*Assistant Examiner* — Brandon Bowers
(74) *Attorney, Agent, or Firm* — Foley & Lardner LLP

(57) ABSTRACT

The present embodiments relate to critical path aware voltage drop analysis. A method can include identifying a number of cell instances with largest individual power consumption values. The method can include identifying, by performing static timing analysis, a first number of circuit timing paths of an integrated circuit design with largest timing violations. The method can include identifying, by performing the static timing analysis, a second number of circuit timing paths of the integrated circuit design. Each of the second number of circuit timing paths has a timing violation and is formed by one or more of the identified number of cell instances. The method can include generating logic state toggle vectors by propagating logic states through the first and second numbers of circuit timing paths. The method can include performing voltage drop analysis on the integrated circuit design using the generated logic state toggle vectors.

20 Claims, 6 Drawing Sheets

CRITICAL PATH AWARE VOLTAGE DROP ANALYSIS OF AN INTEGRATED CIRCUIT

TECHNICAL FIELD

The present disclosure relates generally to integrated circuits, including but not limited to methods and apparatuses for performing voltage drop analysis on integrated circuits.

BACKGROUND

Integrated circuits can include many thousands and perhaps millions of circuit elements (e.g., transistors, logic gates, diodes) and interconnecting wires and busses. Electronic design automation (EDA) tools are generally used to design such integrated circuits. The EDA tools can be used to perform timing analysis on the integrated circuit designs so that optimization, if needed, can be made to ensure that a final design implementation can meet timing and other requirements.

SUMMARY

The present embodiments relate to critical path aware voltage drop analysis of an integrated circuit design. According to some aspects, embodiments relate to a method of circuit design analysis. The method can include identifying a number of cell instances with largest individual power consumption values amongst a plurality of cell instances of an integrated circuit design. The method can include identifying, by performing static timing analysis on the integrated circuit design, a first number of circuit timing paths of the integrated circuit design with largest timing violations. The integrated circuit design can have a plurality of circuit timing paths formed by the plurality of cell instances. The method can include identifying, by performing the static timing analysis on the integrated circuit design, a second number of circuit timing paths of the integrated circuit design. Each of the second number of circuit timing paths has a timing violation and is formed at least in part by one or more of the identified number of cell instances. The method can include generating logic state toggle vectors by propagating logic states through the first number of circuit timing paths and the second number of circuit timing paths. The method can include performing voltage drop analysis on the integrated circuit design using the generated logic state toggle vectors.

According to some aspects, embodiments relate to a system for circuit design analysis. The system can include one or more processors. The one or more processors can determine a number of cell instances with largest individual power consumption values in an integrated circuit design. The one or more processors can determine, from static timing analysis on the integrated circuit design, a first number of circuit timing paths of the integrated circuit design with largest timing violations. The integrated circuit design can have a plurality of circuit timing paths defined by the plurality of cell instances. The one or more processors can determine, from the static timing analysis on the integrated circuit design, a second number of circuit timing paths of the integrated circuit design. Each of the second number of circuit timing paths has a timing violation and is defined at least in part by one or more of the identified number of cell instances. The one or more processors can generate logic state toggle vectors by propagating logic states through the first number of circuit timing paths and the second number of circuit timing paths. The one or more processors can perform voltage drop analysis on the integrated circuit design using the generated logic state toggle vectors.

According to some aspects, embodiments relate to a computer readable storage medium having instructions stored thereon which, when executed by a computer, cause the computer to execute a method. The method can include identifying a number of cell instances with largest individual power consumption values amongst a plurality of cell instances of an integrated circuit design. The method can include identifying, from static timing analysis on the integrated circuit design, a first number of circuit timing paths of the integrated circuit design with largest timing violations. The integrated circuit design can have a plurality of circuit timing paths formed by the plurality of cell instances. The method can include identifying, from the static timing analysis on the integrated circuit design, a second number of circuit timing paths of the integrated circuit design. Each of the second number of circuit timing paths has a timing violation and is formed at least in part by one or more of the identified number of cell instances. The method can include generating logic state vectors by propagating logic states through the first number of circuit timing paths and the second number of circuit timing paths. The method can include performing voltage drop analysis on the integrated circuit design using the generated logic state toggle vectors.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein:

FIG. 3 illustrates example results from timing analysis, according to the present embodiments;

DETAILED DESCRIPTION

Figure 1:
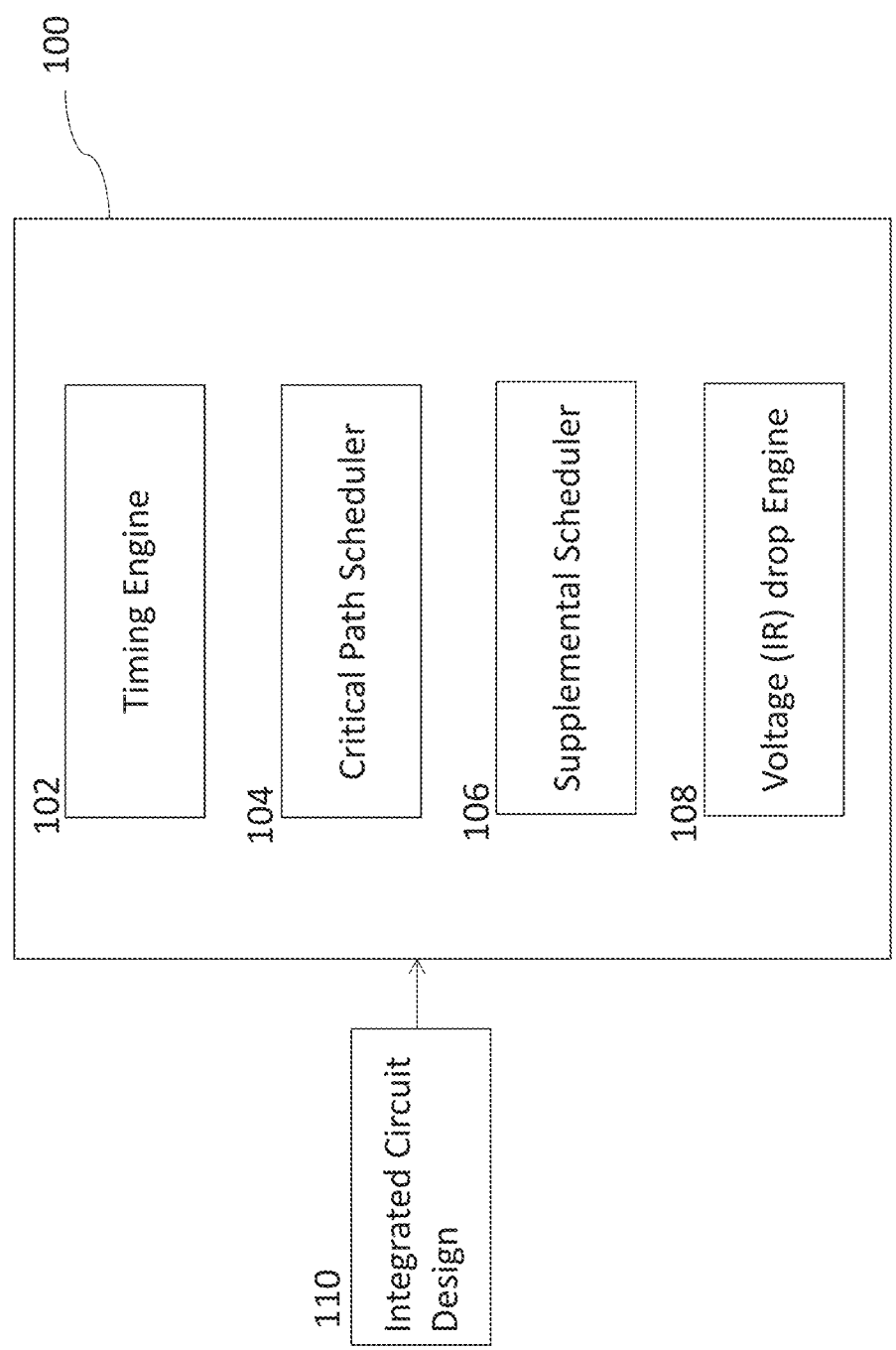
FIG. 1 illustrates a block diagram of a system for critical path aware voltage drop analysis of an integrated circuit design, according to the present embodiments.

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

The present embodiments relate to critical path aware voltage drop analysis of an integrated circuit design. An integrated circuit (IC) design may include millions, if not billions, of components such as transistors, resistors, and capacitors. Analysis and optimization of such designs to ensure satisfaction of various types of requirements (e.g., timing, power, voltage drop, signal integrity) is challenging. The satisfaction of the various types of requirements (e.g., timing closure, power closure) is sometimes collectively referred as design closure. Conventional integrated circuit design analysis tools (also referred as electronic design automation (EDA) tools) and processes are generally designed to perform specific types of analysis without enough consideration for other types of requirements, hence leading to deficiencies in the accuracy of results. To address this, one can attempt to set very conservative constraints to account for the inaccuracy in the analysis results. However, it is difficult and sometimes impossible to create and optimize an IC design to meet such conservative constraints, resulting inefficient use of engineering resources and delays in bringing an IC product to market.

To address at least some of the challenges in implementing IC design, embodiments of the systems and methods described herein can provide critical path aware voltage drop analysis. Cell instances of an IC design (e.g., a gate level synthesized circuit or netlist) that fall in timing critical paths can be modeled in a transient vectorless power analysis flow. This can provide improved voltage drop analysis (sometimes referred as IR drop analysis, where I refers to current and R refers to resistance) by including or ensuring analysis of timing critical cell instances, leading to faster design closure. Such a voltage drop analysis is sometimes referred as (timing) critical path aware voltage drop analysis. The output or results of a critical path aware voltage drop analysis can provide feedback opportunity to a timing engine (e.g., for performing static timing analysis on the IC design), which can therefore target a more accurate timing analysis to facilitate timing (and design) closure.

FIG. 1 illustrates an example block diagram of a system 100 (sometimes referred as an EDA system) for critical path aware voltage drop analysis of an IC design. In brief overview, the system 100 can include a timing engine 102, a critical path schedule 104, a supplemental scheduler 106 and/or a voltage or IR drop engine 108. The system can perform various analyses on an IC design 110 to facilitate design closure.

Each of the above-mentioned elements or components is implemented in hardware, or a combination of hardware and software, in one or more embodiments. Each component of the system 200 may be implemented using hardware or a combination of hardware or software detailed herein in connection with FIG. 5. For instance, each of these elements or components can include any application, program, library, script, task, service, process or any type and form of executable instructions executing on a computing device (e.g., work station, or server of a cloud computing platform). The hardware includes circuitry such as one or more processors in one or more embodiments.

An IC design can include a plurality of electronic components (e.g., semiconductor-based) built into an electrical network in a circuit representation. The electronic components can include circuit cells such as one or more types of logic gates (e.g., physical devices each implementing a Boolean function, or performing a logical operation on one or more binary inputs to produce a binary output), such as AND, OR, NOR, buffer, inverter, XOR, OR-AND-Invert gates. The electronic components can include logic circuits, logic gates or logic devices such as flip-flops, multiplexers, registers, arithmetic logic units (ALUs), and computer memory. The electronic components can include or incorporate the use of transistors, such as field-effect transistors (FETs). The electronic components are sometimes referred as cells (e.g. standard cells from a standard cell library). An IC design can include multiple instances of a same electronic component, and each of these can be referred as a cell instance. The electronic components of an IC design are referred generally as cell instances. As used herein, an IC design can be part of or include all parts of an IC chip's design.

The IC design can include a synchronous digital design, where a data signal is supposed to move in lockstep, advancing one stage on each specific transition of a clock signal. This is enforced by synchronizing elements such as flip-flops or latches, which copy their input to their output when instructed to do so by the clock. By way of an example, a signal serving as an input to a flip-flop for instance can arrive at the flip-flop after a timing delay, relative to the time at which the signal is first made available at a source. The signal propagates along a timing path (or delay path) from the source through one or more electronic components to the flip-flop. The timing delay can cause the signal to arrive too late relative to a clock signal transition at the flip-flop (e.g., missing the time when the signal should advance). The timing delay can cause the signal to change too soon at the input of the flip-flop, after the clock signal's active transition. Hence, an IC design can include a plurality of timing paths established via the electrical network of electronic components or cell instances. The ID design is sometimes referred as a gate level design.

The system 100 can include one or more electronic design automation tools or analysis engines (e.g., timing engine 102, critical path schedule 104, supplemental scheduler 106 and/or voltage drop engine 108). For instance, the system can include separate analysis engines (e.g., each performing their respective analyses by executing on different processors or cores, and/or at different times). Each analysis engine can have an interface or API for receiving inputs (e.g., information about the integrated circuit design, and/or an output from another analysis engine). Each analysis engine can have an interface generating an output and/or providing the output to another analysis engine. In some embodiments, the system can include an integrated set of analysis engines each in communication with at least another analysis engine (e.g., to perform the critical path aware voltage drop analysis).

Figure 3:
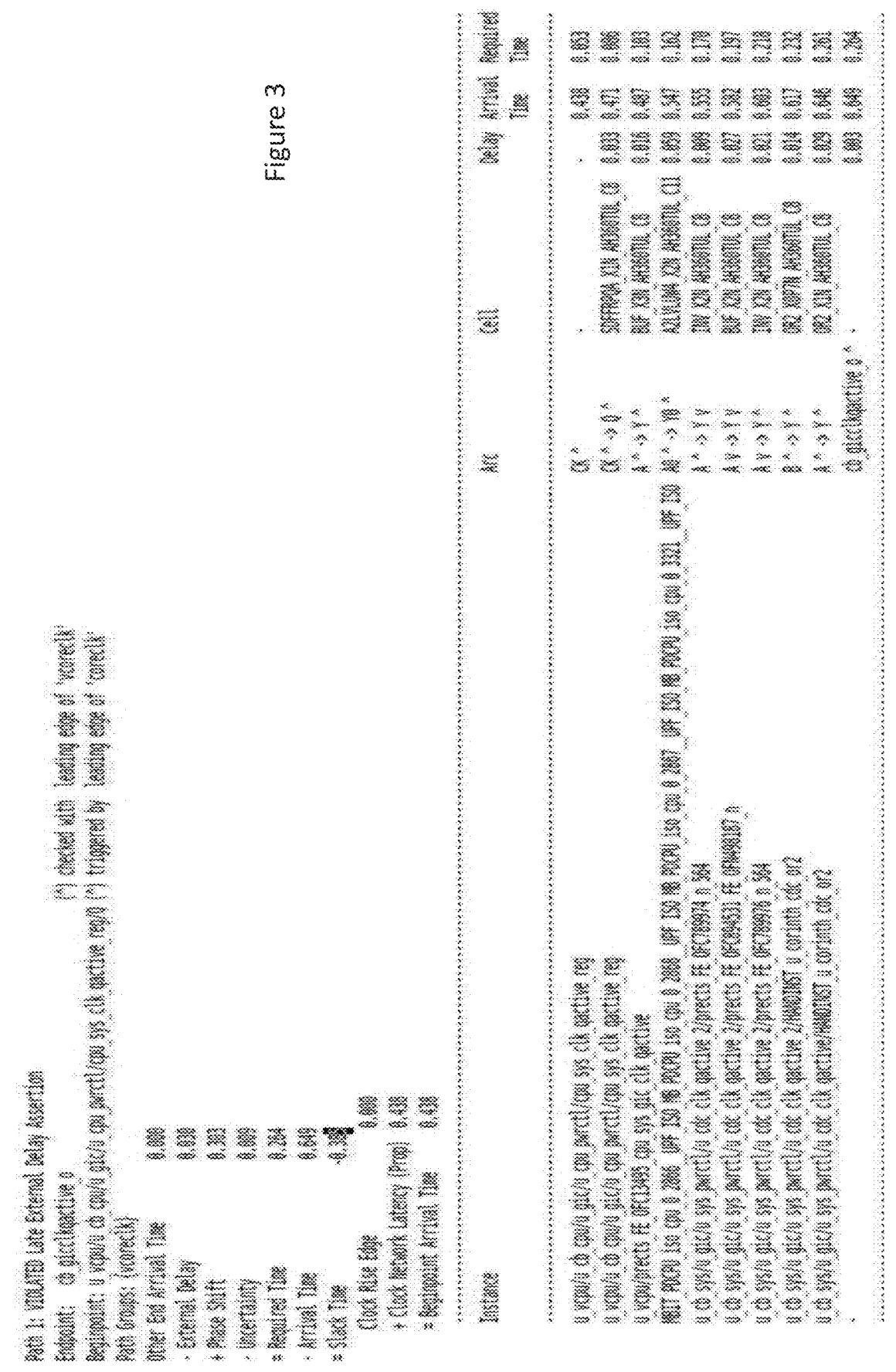

The system 100 can a timing engine 102. The timing engine can be designed and implemented to perform static timing analysis on the IC design. Static timing analysis (STA) can refer to a simulation method of computing an expected timing of a digital circuit without requiring a simulation of the full circuit. The timing engine can analyze, simulate, check and/or evaluate the timing paths (or circuit timing paths) of the IC design. The timing engine can calculate or determine a timing or propagation delay of a signal across one or more cell instances and/or along one or more nets or wire connections. As such, the timing engine can be used to analyze or evaluation the ability of a circuit to operate at a specified speed characterized by a corresponding clock signal's frequency. An example of a timing delay of a timing path is shown (e.g., displayed in an illustrative report format) in FIG. 3. A slack time of −0.305 millisecond is shown.

As mentioned above, data signals are supposed to move in lockstep, advancing one stage on each active transition of an associated clock signal. Synchronizing elements such as flip-flops or latches can copy their input (input signal) to their output when instructed to do so by the clock signals. The kinds of timing errors that are possible can include a setup time violation, when a signal arrives too late, and misses the time when it should advance, and a hold time violation, when an input signal changes too soon after the clock's active transition. The time when a signal arrives can vary due to many reasons. The input data signal may vary, the circuit may perform different operations, the temperature may change, and there are manufacturing differences in the exact construction of each part of the circuit. A goal of static timing analysis is to verify that despite these possible variations, the signals can arrive neither too early nor too late, so as to ensure proper circuit operation.

In some embodiments, the timing engine can identify, a first number of circuit timing paths of the integrated circuit design with largest timing violations. For example, the timing engine can isolate or identify 1000 (e.g., a configurable number) timing paths that are most timing critical, or those with the worst slack. The timing engine can determine, detect or otherwise identify these circuit timing paths by performing static timing analysis on the integrated circuit design. The timing engine can identify a predefined number (e.g., 100 or other number) or percentage (e.g., 2% or other percentage) of circuit timing paths with largest timing violations (e.g., largest timing slack value). The timing engine can identify one or more critical paths. A critical path can be defined as the path between an input and an output with the maximum delay. The timing engine 102 can identify a number of such circuit timing paths (e.g., a first number of circuit timing paths) to perform logic state propagation.

The timing engine can perform STA according to at least some of the following definitions or concepts. An arrival time of a signal is the time elapsed for a signal to arrive at a certain point. The reference, or time 0.0, is often taken as the arrival time of a clock signal. To calculate the arrival time, delay calculation of all the components in the timing path can be performed. Arrival times (and other times in timing analysis) can be kept as a pair of values—the earliest possible time at which a signal can change, and the latest. A required time may refer to a latest time at which a signal can arrive without making the clock cycle longer than desired. The computation of the required time can proceed as follows: at each primary output, the required times for rise/fall can be set according to the specifications provided to the circuit. Next, a backward topological traversal is carried out, processing each gate when the required times at all of its fan-outs are known. The slack associated with each connection is the difference between the required time and the arrival time. A positive slack s at some node implies that the arrival time at that node may be increased by s, without affecting the overall delay of the circuit. A negative slack implies that a path is too slow, and the path should be sped up (or the reference signal delayed) if the whole circuit is to work at the desired speed.

In some embodiments, the system can identify a number of cell instances with largest individual power consumption values amongst a plurality of cell instances of an integrated circuit design. For example, the system can isolates or identify 1000 (e.g., a configurable number) cell instances that are most power critical, which are those with the worst power consumption value (e.g., internal power, which can include dynamic power and static power such as leakage power), to compute timing paths though these cell instances. For example, the system (e.g., using the voltage drop engine 108) can perform a scan of the IC design for cell instances that are present, and can identify a defined number (e.g., 200 or other number) or percentage (e.g., 4% or other percentage) of the cell instances with largest individual power consumption values. The system can calculate, extract, identify or otherwise determine an individual power consumption value of a cell instance by accessing and/or using power-related information of a corresponding cell (e.g., characterized power information of a standard cell, included in a standard cell library). The system can identify the cell instance in any form or format, such as in a list of cell instance names.

The timing engine 102 can receive as input the identified cell instance with largest individual power consumption values (e.g., in the form of a list of cell instance names). The timing engine can identify or determine timing paths of the IC design that traverse through (or is formed by or defined using) at least one of the identified cell instances. The timing engine 102 can perform timing STA on at least these circuit timing paths. The timing engine 102 can identify, from these circuit timing paths, a number of circuit timing paths that each has a timing violation. For example, the timing engine can determine, detect or otherwise identify these circuit timing paths that each has a timing violation, by performing static timing analysis on the integrated circuit design. The timing engine can identify a predefined number (e.g., 100 or other number) or percentage (e.g., 2% or other percentage) of circuit timing paths (that traverse through at least one of the identified cell instances) with largest timing violations (e.g., largest timing slack value). The timing engine can identify a predefined number (e.g., 100 or other number) or percentage (e.g., 2% or other percentage) of critical paths from the circuit timing paths that traverse through at least one of the identified cell instances. The timing engine 102 can identify a number of such circuit timing paths (e.g., a second number of circuit timing paths) to perform logic state propagation.

The first number of circuit timing paths and the second number of circuit timing paths can be identified or selected independently or separately. These timing paths can be collectively referred as critical paths or timing critical paths (of the IC design). In some embodiments, the first number of circuit timing paths and the second number of circuit timing paths can be identified or selected according to one or more of the same or similar criteria (e.g., set to a fixed number or fixed percentage of the respective sets of timing paths with timing violations, or set to meet a common threshold for the extent of timing violation or slack).

The system can be designed and implemented to perform power analysis. The system can perform electrical power analysis: Power analysis can be a method to measure a rate at which electrical energy is consumed per unit time in an electrical circuit. In some embodiments, the system (e.g., the voltage drop engine) can perform transient analysis, which can be a process to measure or estimate an amount of current flowing across every cell instance (or gate) of a circuit at a particular given time. The estimated current (I) can be used to calculate power (P) once the cell instance's voltage is known by P=I*V. In some embodiments, the system can perform vectorbased power analysis, which can for instance use signal toggling and/or transition data (e.g., value change dump (VCD)) from simulation to know the activity of a cell instance at a given time. This activity can be used to estimate the current flowing across the instance, to use to compute power. In some embodiments, the system can perform (transient) vectorless power analysis, which can use predictive and/or statistical algorithms to estimate the instantaneous activity of a sequential element (e.g., flip-flop cell instance) and corresponding combinational elements (e.g., logic gate cell instances). The estimated activity can be used to compute transient power.

In some embodiments, the system (e.g., the voltage drop engine) can perform transient vectorless power analysis and a corresponding voltage drop analysis. The system can use custom or specific logic state toggle vectors (e.g. as part of estimated activity) to perform the transient vectorless power analysis. The system can use the estimated activity to compute transient power. The system can compute transient current flowing through supply rails (e.g., of cell instances) for each transition registered. The system (e.g., the voltage drop engine) can use the computed transient current (I) and transient power (P) to calculate a voltage of the supply rails (e.g., of cell instances) using P=IV. The system can determine a voltage drop from an expected supply rail voltage (e.g., IR drop=Vsupply−V).

The system can include a critical path scheduler 104. The critical path scheduler 104 can perform state propagation, e.g., by predicting the exact instantaneous state of primary input and sequential elements in each clock cycle. The critical path scheduler 104 can control a subset of these elements to be toggled to build an activity model (e.g., average vector model). In every clock cycle of a simulation period, a logic state is propagated through the circuit and a current value is estimated for every transition of a signal (e.g., at each cell instance). The critical path scheduler 104 can perform vectorless modeling of at least a portion of the IC design. In this modelling, a subset of sequential elements (e.g., flip-flop, memory, latch cells) of the design can be scheduled to toggle in each clock cycle, representing and providing simulation vectors. These signal toggles can be propagated in the output data cone of the sequential elements. The process can repeated for each clock cycle in a given simulation duration. At the end of this modelling, vectors corresponding to the signal toggles are collected and/or provided to the voltage drop engine. In certain embodiments, the critical path scheduler 104 can perform activity propagation, e.g., by estimating or predicting an average activity of primary inputs and sequential elements, and propagating the activity across at least a portion of the IC design.

The critical path scheduler 104 can be designed and implemented to schedule and/or propagate logic states through the critical paths. The critical path scheduler 104 can generate logic state toggle vectors by propagating logic states through the critical timing paths (e.g., the first number of circuit timing paths and the second number of circuit timing paths). The critical path scheduler 104 can generate the logic state toggle vectors by propagating logic states through the first number of circuit timing paths and the second number of circuit timing paths, for each clock cycle in a simulation duration (e.g., a duration of 2 sec, or other duration). The logic state toggle vectors can be collected and/or written into one or more activity files (e.g., to be accessed and/or used by the voltage drop engine). The logic state toggle vectors can be provided to the voltage drop engine (e.g., via an application programming interface (API) or in one or more files).

The system can include a supplemental scheduler 106. The supplemental scheduler can include any one or more of the functionalities and features of any embodiment of the critical path scheduler. The supplemental scheduler and the critical path scheduler can be the same component of the system or different components. In some embodiments, the supplemental scheduler and the critical path scheduler are part of or incorporated in a single scheduler in the system. The supplemental scheduler and/or the critical path scheduler can include a pseudo simulator that can control the operation and/or output(s) of flip-flop cell instances, to allow logic states (signals) to flow through at least a portion (e.g., specific timing paths) of the IC design.

The supplemental scheduler 106 can be designed and implemented to schedule and/or propagate logic states through any portion or all of IC design. The supplemental scheduler 106 can be designed and implemented to schedule and/or propagate logic states through any portion or all of the timing paths of the IC design. The supplemental scheduler 106 can generate logic state toggle vectors by propagating logic states through selected or desired timing paths and/or portion of the IC design. A designer of the IC design, a user of the system 100, and/or a program can identify, define or otherwise select the desired timing paths and/or portion of the IC design. For example, the desired timing paths and/or portion of the IC design can be selected or identified according to a specified or expected activity level and/or operational/functional mode of the IC design (e.g., to ensure a realistic simulation or representation of the IC design's operation). The supplemental scheduler 106 can generate the logic state toggle vectors by propagating logic states through the selected or desired timing paths, for each clock cycle in a simulation duration (e.g., a duration of 2 sec, or other duration). These logic state toggle vectors can be collected and/or written into one or more activity files (e.g., to be accessed and/or used by the voltage drop engine). These logic state toggle vectors can be provided to the voltage drop engine (e.g., via an application programming interface (API) or in one or more files). Logic state toggle vectors, gathered from the desired timing paths and/or portion of the IC design, are typically bound by a simulation duration, and hence may miss on analysis of certain cell instances that are power critical and/or timing critical. Logic state toggle vectors, gathered from the critical path scheduler, can address at least some of this deficiency.

In some embodiments, a single scheduler (e.g., the critical path scheduler or the supplemental scheduler) can generate logic state toggle vectors by propagating logic states through the first number of circuit timing paths and the second number of circuit timing paths, for each clock cycle in a simulation duration. The single schedule can generate logic state toggle vectors equivalent to that generated by the critical path scheduler combined with that generated by the supplemental scheduler, in a single simulation run for instance. Hence, there is preferential logic state scheduling of pre-identified timing critical paths (that includes timing critical paths involving power critical cell instances) in the IC design for transient vectorless analysis.

The system can include a voltage drop engine 108. The voltage drop engine can be designed and implemented to perform voltage or IR drop analysis. The voltage drop engine can perform transient vectorless power analysis and a corresponding voltage drop analysis. The voltage drop engine can use custom or specific logic state toggle vectors (e.g. as part of estimated activity) to perform the transient vectorless power analysis. The voltage drop engine can use the estimated activity to compute or determine transient power. The voltage drop engine can compute or determine transient current flowing through supply rails (e.g., of each cell instance) for each transition registered. The voltage drop engine can use the computed transient current (I) and transient power (P) to calculate or determine a voltage (V) of the supply rails (e.g., of each cell instance) using P=IV. The system can determine a voltage drop from an expected supply rail voltage (Vsupply), e.g., voltage drop=Vsupply−V. The voltage drop engine can determine a voltage (e.g., critical path aware voltage) and/or voltage drop (e.g., critical path aware voltage drop) for each cell instance of the IC design.

In accordance with embodiments of the systems and methods disclosed herein the voltage drop engine can perform transient (current) analysis and transient vectorless power analysis, based on the vectorless modeling of the circuit, by using the logic state toggle vectors generated and/or gathered by the critical path scheduler, as well as the logic state toggle vectors generated and/or gathered by the supplemental scheduler. The inclusion of the critical paths in the methods disclosed herein, including those critical paths associated with cell instances that are power critical, can ensure that the voltage drop impact on these cell instances are considered and analyzed.

The timing engine can perform voltage drop aware timing analysis. The timing engine can use the voltage (e.g., critical path aware voltage) and/or voltage drop (e.g., critical path aware voltage drop) of each cell instance, to perform timing analysis (e.g., STA). For instance, the timing engine can interpolate a cell instance's voltage against ideal operating voltages provided in delay libraries (or models of the cell instance) to model and calculate an accurate delay of the cell instance in a timing path. The calculated delay is used by the timing engine to create an accurate timing model of the cell delay (and the IC design). This can improve timing closure and overall design closure over existing processes. In contrast, no existing EDA tool performs timing critical path aware voltage drop analysis, and/or timing critical path aware vectorless IR drop analysis, and back-annotates voltages on timing paths to do IR drop aware timing analysis.

Figure 2:
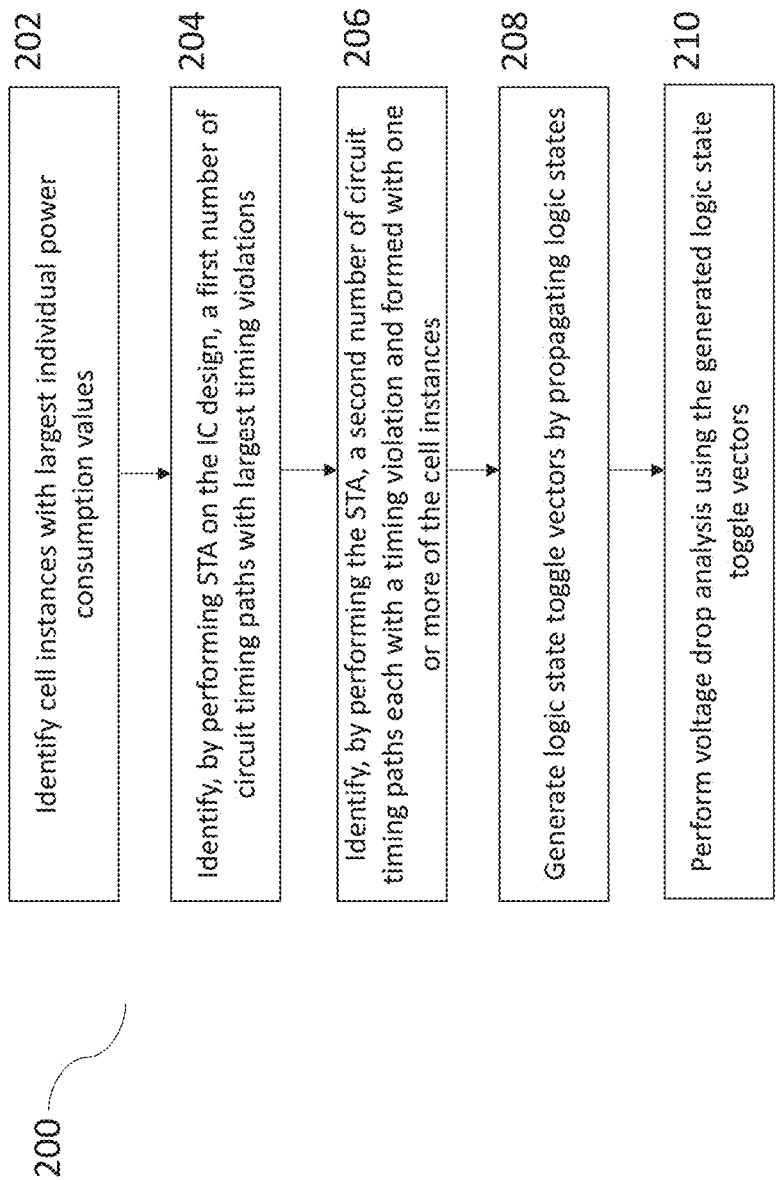
FIG. 2 illustrates a flow chart of an example process for critical path aware voltage drop analysis of an integrated circuit design, according to the present embodiments.

FIG. 2 illustrates a flow chart of an example process 200 to facilitate and/or perform power analysis on an integrated circuit design, in accordance with various embodiments of the present disclosure. It is noted that the process 200 is merely an example, and is not intended to limit the present disclosure. Additional operations can be provided before, during, and after the process 200, and some operations described below can be replaced, eliminated, or move around in accordance with additional embodiments. In some embodiments, the system 100 (FIG. 1) may perform the process 200 on an IC design.

The process 200 can include identifying cell instances with largest individual power consumption values (operation 202). In some embodiments, the operation 202 may include identifying (e.g., using a voltage drop engine) a number of cell instances with largest individual power consumption values amongst a plurality of cell instances of an integrated circuit design. For instance, the system 200 can identify or determine such cell instances that are power critical, according to one or more operations or steps discussed above in connection with FIG. 1.

Referring again to FIG. 2, the process 200 can include identifying, by performing STA on the IC design, a first number of circuit timing paths with largest timing violations (operation 204). In some embodiments, the operation 202 may include identifying, by a timing engine performing static timing analysis on the integrated circuit design, a first number of circuit timing paths of the integrated circuit design with largest timing violations. The integrated circuit design can have a plurality of circuit timing paths formed by the plurality of cell instances. For instance, the timing engine can identify or determine the first number of circuit timing paths according to one or more operations or steps discussed above in connection with FIG. 1.

Referring again to FIG. 2, the process 200 can include identifying, by performing the STA, a second number of circuit timing paths each with a timing violation and formed with one or more of the cell instances violations (operation 206). In some embodiments, the operation 202 may include identifying, by the timing engine performing the static timing analysis on the integrated circuit design, a second number of circuit timing paths of the integrated circuit design. Each of the second number of circuit timing paths can have a timing violation and can be formed at least in part by one or more of the identified number of cell instances. For instance, the timing engine can identify or determine the second number of circuit timing paths according to one or more operations or steps discussed above in connection with FIG. 1.

Referring again to FIG. 2, the process 200 can include generating logic state toggle vectors by propagating logic states (operation 208). In some embodiments, the operation 202 may include generating, by a critical path scheduler, logic state toggle vectors by propagating logic states through the first number of circuit timing paths and the second number of circuit timing paths. The critical path scheduler can generate the logic state toggle vectors by propagating logic states through the first number of circuit timing paths and the second number of circuit timing paths, for each clock cycle in a simulation duration. For instance, the critical path scheduler can generate the logic state toggle vectors according to one or more operations or steps discussed above in connection with FIG. 1. The critical path scheduler (and/or a supplemental schedule) can generate additional logic state toggle vectors by propagating logic states through a subset of the plurality of cell instances. For instance, the critical path scheduler (and/or a supplemental schedule) can generate the additional logic state toggle vectors according to one or more operations or steps discussed above in connection with FIG. 1.

Referring again to FIG. 2, the process 200 can include performing voltage drop analysis using the generated logic state toggle vectors (operation 210). In some embodiments, the operation 202 may include performing, by the voltage drop engine, voltage drop analysis on the integrated circuit design using the generated logic state toggle vectors. The voltage drop engine can perform the voltage drop analysis on the integrated circuit design using the generated logic state toggle vectors and the generated additional logic state toggle vectors. For instance, the voltage drop engine can perform voltage drop analysis according to one or more operations or steps discussed above in connection with FIG. 1.

The voltage drop engine can determine voltage values for the plurality of cell instances, by performing the voltage drop analysis. The voltage drop engine can determine current values of the plurality of cell instances according to the logic state toggle vectors generated for each clock cycle in the simulation duration. For instance, the voltage drop engine can determine or calculate the current values of the plurality of cell instances according to one or more operations or steps discussed above in connection with FIG. 1. The voltage drop engine can perform the voltage drop analysis on the integrated circuit design using the determined current values of the plurality of cell instances. The timing engine can perform an updated static timing analysis using the determined voltage values for the plurality of cell instances. For instance, the timing engine can perform an updated static timing analysis (using the critical path aware voltages or voltage drops) according to one or more operations or steps discussed above in connection with FIG. 1.

Figure 4A:
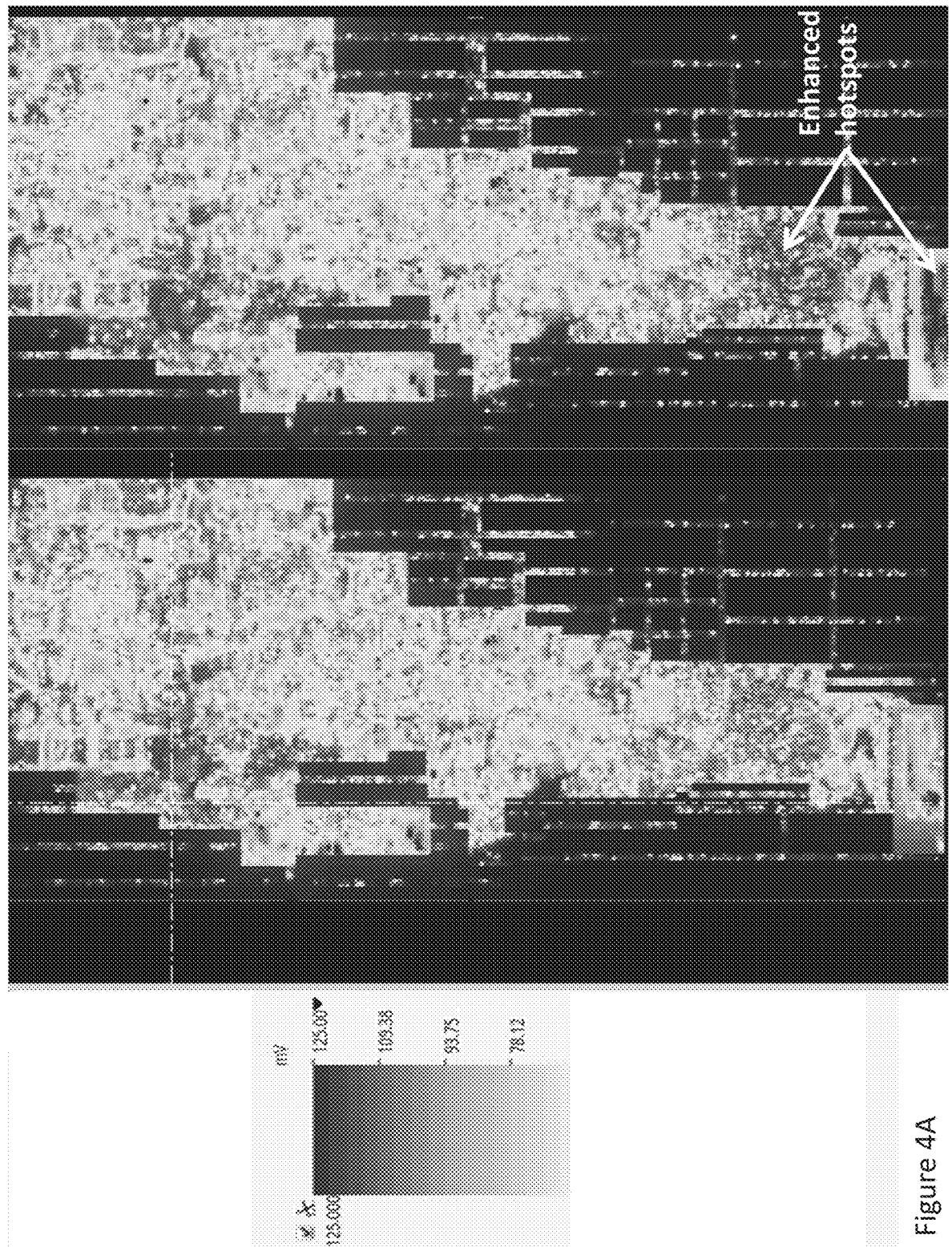
FIGS. 4A and 4B illustrate example results from critical path aware voltage drop analysis for comparison against reference results, according to the present embodiments.

FIG. 4A provides illustrative results of a voltage drop analysis on an IC design performed by considering critical paths (right side plot) and without considering critical paths (left side plot). The right-most portion of FIG. 4A provides a legend of color intensities corresponding to various ranges of voltage drops across the IC design. As indicated in the right plot, certain hotspots for voltage drops are enhanced (corresponding to larger voltage drop values). Such larger voltage drop values are determined by performing critical path aware voltage drop analysis (e.g., as described herein), and corresponds to results of higher accuracy (relative to the left side plot). Hence, the more severe hotspots can be considered when performing voltage drop aware timing analysis. The timing engine can use the voltage (e.g., critical path aware voltage) and/or voltage drop (e.g., critical path aware voltage drop) of each cell instance in the voltage drop aware timing analysis to achieve timing results of improved accuracy, to assist in timing closure (and design closure).

Figure 4B:
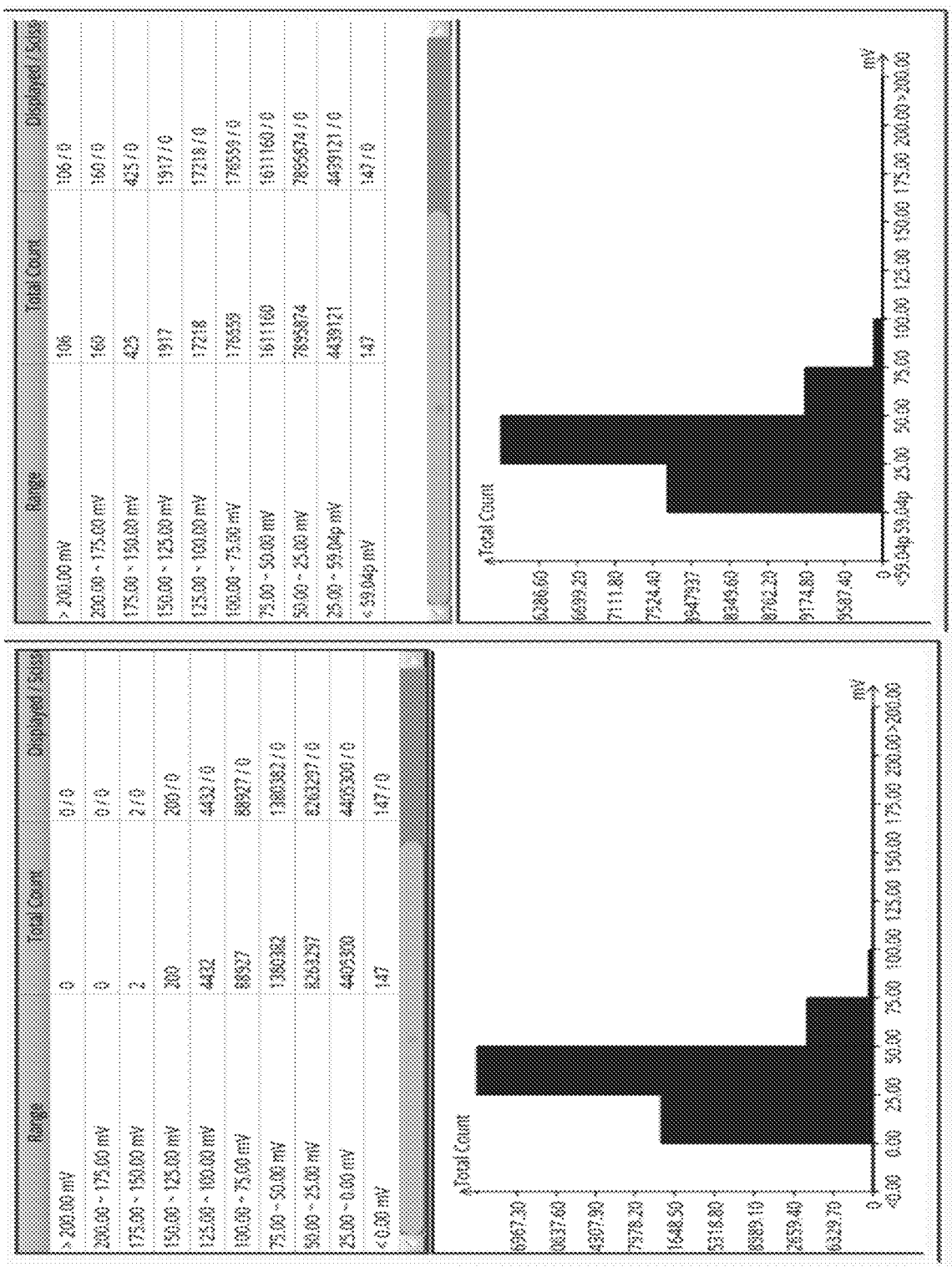

FIG. 4B provides further illustrative results of a voltage drop analysis on an IC design performed by considering critical paths (right side histogram and table) and without considering critical paths (left side histogram and table). Although the two histograms may appear similar by showing a similar profile, the detailed values in the corresponding tables show significant differences in the results. For example, there is a higher total count of instances (e.g., cell instances or hotspots) in the right side table as a result of the critical path aware voltage drop analysis. Such larger voltage drop values are determined by performing critical path aware voltage drop analysis (e.g., as described herein), and corresponds to results of higher accuracy (relative to the left side histogram and table). Hence, the more severe hotspots can be considered when performing voltage drop aware timing analysis, and any corresponding voltage drop aware timing analysis.

Table 1 below provides further illustration of results of a voltage drop analysis on a timing path performed by considering critical paths (right side of table 1) and without considering critical paths (left side of table 1). The timing path incorporates and traverses the cell instances listed in the right-most column. As can be seen, the peak current drawn from power rails corresponding to each cell instance (determined via transient current analysis) is higher and more accurate under the critical path aware flow. Hence, the corresponding voltages (Elapsed EIV) are also more accurate (relatively lower values), translating to relatively larger voltage drops. Therefore, a timing critical path aware flow is able to model timing critical instances, resulting in a more accurate voltage drop analysis.

TABLE 1

| Conventional flow | | Critical Path Aware flow | | |
|---|---|---|---|---|
| Peak Current (mA) | Elapse EIV(V) | Peak Current (mA) | Elapse EIV(V) | Instances in path |
| 0.19 | 0.92910 | 0.549 | 0.91936 | Begin point (FF) |
| 0.143e−03 | 0.91646 | 1.011 | 0.91807 | BUF 1 |
| 0.336e−03 | 0.93634 | 0.761 | 0.91311 | BUF 2 |
| 0.7025e−04 | 0.87583 | 0.772 | 0.84148 | BUF 3 |
| 0.1067e−03 | 0.90914 | 0.665 | 0.84044 | BUF 4 |
| 0.7029e−04 | 0.93550 | 0.525 | 0.85394 | BUF 5 |
| 0.619e−04 | 0.95438 | 0.181 | 0.84971 | BUF 6 |
| 0.692e−04 | 0.95422 | 0.428 | 0.84702 | BUF 7 |
| | | | | End point |

Figure 5:
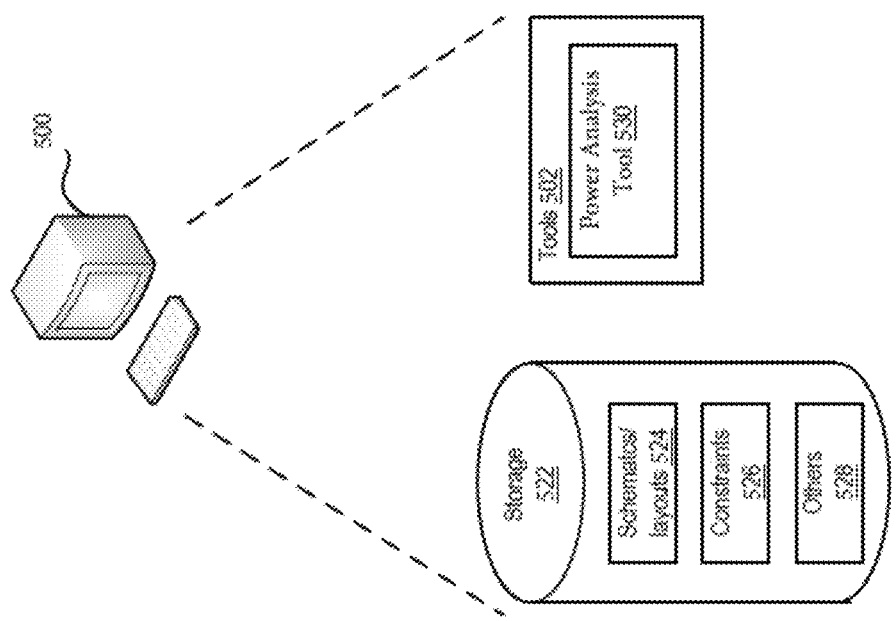
FIG. 5 is a functional block diagram illustrating an example system, according to the present embodiments.

FIG. 5 is a functional block diagram of an example system for facilitating and/or performing power analysis by generating an interface model on an integrated circuit, according to the present embodiments. In some embodiments, the system 500 can be one or more computers that are loaded with software (e.g., EDA tools) and/or customized to include hardware for interactively and/or automatically implementing designs of integrated circuits (e.g., ASICs, SoCs, full custom digital ICs). In some embodiments, the one or more computing systems 500 comprise various components not shown such as processor(s) or processor core(s), memory, disks, etc. The software and/or custom hardware may include interactive or automated modules such as a timing engine, a voltage drop engine, a placer, a routing engine, a layout editor, a wire editor, a design rule checker, a verification engine, a module generator, and/or a floor-planner, etc., as will be appreciated by those skilled in the art.

In one or more embodiments, the computing system 500 may further write to and read from a local or remote volatile or non-volatile computer accessible storage 522 that stores thereon data or information such as, but not limited to, one or more databases such as gate level designs/netlists, post-placement layouts, schematic design database(s) or physical design database(s) 524 (e.g., GDS II or OASIS data, etc.), libraries, rule decks, constraints (e.g., track specifications, minimum spacing, pitch/width requirements, widths, BCB rules), etc. 526, and/or other information or data 528 (e.g., trim shape locations) that may be required to support the methodology of the present embodiments. According to certain aspects, design rules in storage 526 are extendable or changeable (e.g., via APIs and the like) without changing other components or data in system 500.

In some embodiments, the one or more computing systems are implemented in a "cloud" configuration and/or a client/server configuration. For example, one or more server computers may be loaded with application software (e.g., a timing engine and/or other EDA tool) for implementing some or all of the methodology of the present embodiments, and one or more client computers can communicate with the server computer(s) via a network to perform some or all of the methodology of the embodiments for a particular design.

In some embodiments, the one or more computing systems 500 may, by various standalone software, hardware modules or combinations thereof 502 (e.g., EDA tool), include a system 100 that can perform critical path aware voltage drop analysis. The system 100 can execute the process 200 discussed above in relation to FIG. 2. The system 100 may be implemented by adapting or communicating with certain pre-existing modules (e.g., placer, router, layout editor, design rule checker) as may be required to implement a methodology to implement design rule correct IC designs according to the present embodiments and as described above. Those skilled in the art will be able to understand how to implement various examples of such modules after being taught by the present disclosure.

Although the present embodiments have been particularly described with reference to preferred ones thereof, it should be readily apparent to those of ordinary skill in the art that changes and modifications in the form and details may be made without departing from the spirit and scope of the present disclosure. It is intended that the appended claims encompass such changes and modifications.

What is claimed is:

1. A method of circuit design analysis, comprising:
   identifying a number of cell instances with largest individual power consumption values amongst a plurality of cell instances of an integrated circuit design;
   identifying, by performing static timing analysis on the integrated circuit design, a first number of circuit timing paths of the integrated circuit design with largest timing violations, the integrated circuit design having a plurality of circuit timing paths formed by the plurality of cell instances;
   identifying, by performing the static timing analysis on the integrated circuit design, a second number of circuit timing paths of the integrated circuit design, each with a timing violation and formed at least in part by one or more of the identified number of cell instances;
   generating logic state toggle vectors by propagating logic states through the first number of circuit timing paths and the second number of circuit timing paths; and
   performing voltage drop analysis on the integrated circuit design using the generated logic state toggle vectors.

2. The method of claim 1, further comprising generating additional logic state toggle vectors by propagating logic states through a subset of the plurality of cell instances.

3. The method of claim 2, comprising performing the voltage drop analysis on the integrated circuit design using the generated logic state toggle vectors and the generated additional logic state toggle vectors.

4. The method of claim 1, comprising generating the logic state toggle vectors by propagating logic states through the first number of circuit timing paths and the second number of circuit timing paths, for each clock cycle in a simulation duration.

5. The method of claim 4, comprising determining current values of the plurality of cell instances according to the logic state toggle vectors generated for each clock cycle in the simulation duration.

6. The method of claim 5, comprising performing the voltage drop analysis on the integrated circuit design using the determined current values of the plurality of cell instances.

7. The method of claim 1, further comprising determining voltage values for the plurality of cell instances, by performing the voltage drop analysis.

8. The method of claim 7, further comprising performing an updated static timing analysis using the determined voltage values for the plurality of cell instances.

9. A system for circuit design analysis, comprising one or more processors, the one or more processors configured to:
   determine a number of cell instances with largest individual power consumption values in an integrated circuit design;
   determine, from static timing analysis on the integrated circuit design, a first number of circuit timing paths of the integrated circuit design with largest timing violations, the integrated circuit design having a plurality of circuit timing paths defined by the plurality of cell instances;
   determine, from the static timing analysis on the integrated circuit design, a second number of circuit timing paths of the integrated circuit design, each with a timing violation and defined at least in part by one or more of the determined number of cell instances;
   generate logic state toggle vectors by propagating logic states through the first number of circuit timing paths and the second number of circuit timing paths; and
   perform voltage drop analysis on the integrated circuit design using the generated logic state toggle vectors.

10. The system of claim 9, wherein the one or more processors are configured to generate additional logic state toggle vectors by propagating logic states through a subset of the plurality of cell instances.

11. The system of claim 10, wherein the one or more processors are configured to perform the voltage drop analysis on the integrated circuit design using the generated logic state toggle vectors and the generated additional logic state toggle vectors.

12. The system of claim 9, wherein the one or more processors are configured to generate the logic state toggle vectors by propagating logic states through the first number of circuit timing paths and the second number of circuit timing paths, for each clock cycle in a simulation duration.

13. The system of claim 12, wherein the one or more processors are configured to determine current values of the plurality of cell instances according to the logic state toggle vectors generated for each clock cycle in the simulation duration.

14. The system of claim 13, wherein the one or more processors are configured to perform the voltage drop analysis on the integrated circuit design using the determined current values of the plurality of cell instances.

15. The system of claim 9, wherein the one or more processors are configured to determine voltage values for the plurality of cell instances, by performing the voltage drop analysis.

16. The system of claim 15, wherein the one or more processors are configured to perform an updated static timing analysis using the determined voltage values for the plurality of cell instances.

17. A computer readable storage medium having instructions stored thereon which, when executed by a computer, cause the computer to execute a method, the method comprising:
   identifying a number of cell instances with largest individual power consumption values amongst a plurality of cell instances of an integrated circuit design;
   identifying, from static timing analysis on the integrated circuit design, a first number of circuit timing paths of the integrated circuit design with largest timing violations, the integrated circuit design having a plurality of circuit timing paths formed by the plurality of cell instances;
   identifying, from the static timing analysis on the integrated circuit design, a second number of circuit timing paths of the integrated circuit design, each with a timing violation and formed at least in part by one or more of the identified number of cell instances;
   generating logic state vectors by propagating logic states through the first number of circuit timing paths and the second number of circuit timing paths; and
   performing voltage drop analysis on the integrated circuit design using the generated logic state toggle vectors.

18. The computer readable storage medium according to claim 17, the method further comprising generating additional logic state toggle vectors by propagating logic states through a subset of the plurality of cell instances.

19. The computer readable storage medium according to claim 18, the method further comprising performing the voltage drop analysis on the integrated circuit design using the generated logic state toggle vectors and the generated additional logic state toggle vectors.

20. The computer readable storage medium according to claim 17, the method further comprising generating the logic state toggle vectors by propagating logic states through the first number of circuit timing paths and the second number of circuit timing paths, for each clock cycle in a simulation duration.

* * * * *